United States Patent [19]

Hampton

[11] Patent Number: 4,794,238

[45] Date of Patent: Dec. 27, 1988

[54] METHOD AND APPARATUS FOR READING AND MARKING A SMALL BAR CODE ON A SURFACE OF AN ITEM

[75] Inventor: Gordon P. Hampton, Cupertino, Calif.

[73] Assignee: Ultracision, Inc., Santa Clara, Calif.

[21] Appl. No.: 107,565

[22] Filed: Oct. 9, 1987

[51] Int. Cl.⁴ ............................................... G06K 7/10
[52] U.S. Cl. ................................... 235/462; 235/454; 235/470; 250/566
[58] Field of Search ............... 235/462, 454, 470, 472, 235/471; 250/566, 568, 569, 570

[56] References Cited

U.S. PATENT DOCUMENTS

| | | | |
|---|---|---|---|
| 3,562,536 | 2/1971 | Brunner et al. | 250/566 X |
| 3,629,835 | 12/1971 | Brown et al. | 250/569 |
| 3,812,459 | 5/1974 | MacNeill et al. | 235/470 X |
| 4,010,355 | 3/1977 | Roehrman et al. | 235/462 X |
| 4,105,926 | 8/1978 | Reno et al. | 235/454 X |
| 4,450,349 | 5/1984 | Apitz et al. | 235/462 |
| 4,542,528 | 9/1985 | Sanner et al. | 235/462 |
| 4,603,976 | 8/1986 | Fetzer et al. | 250/566 X |
| 4,652,734 | 3/1987 | Hübel | 235/472 |
| 4,730,293 | 3/1988 | Pierce et al. | 235/462 |

Primary Examiner—Roy N. Envall, Jr.
Assistant Examiner—H. L. Williams
Attorney, Agent, or Firm—Thomas E. Schatzel

[57] ABSTRACT

An apparatus and method for reading a bar code marked on a surface of an item, such as a semiconductor wafer, an improved method for marking the surface and an easily decipherable bar code system are disclosed. The apparatus comprises a collimated light source, a beamsplitter, a first lens system, a second lens system, an image screen and a detector. The method comprises the steps of illuminating the bar code by directing the collimated light perpendicular to the surface, magnifying the coaxial reflected beam, projecting the reflected beam on the image screen and reading the projected image with the detector. The improved method for making the bar code marks on the surface comprises the steps of rotating a diamond impregnated nickel blade, decreasing the relative distance between the surface and the blade until the blade contacts the surface, increasing the relative distance between the surface and the blade, and repeating this process until the desired number of bars are obtained. The easily decipherable bar code system includes characters comprised of wide and narrow bars and spaces patterned after the Roman numeral system.

16 Claims, 1 Drawing Sheet

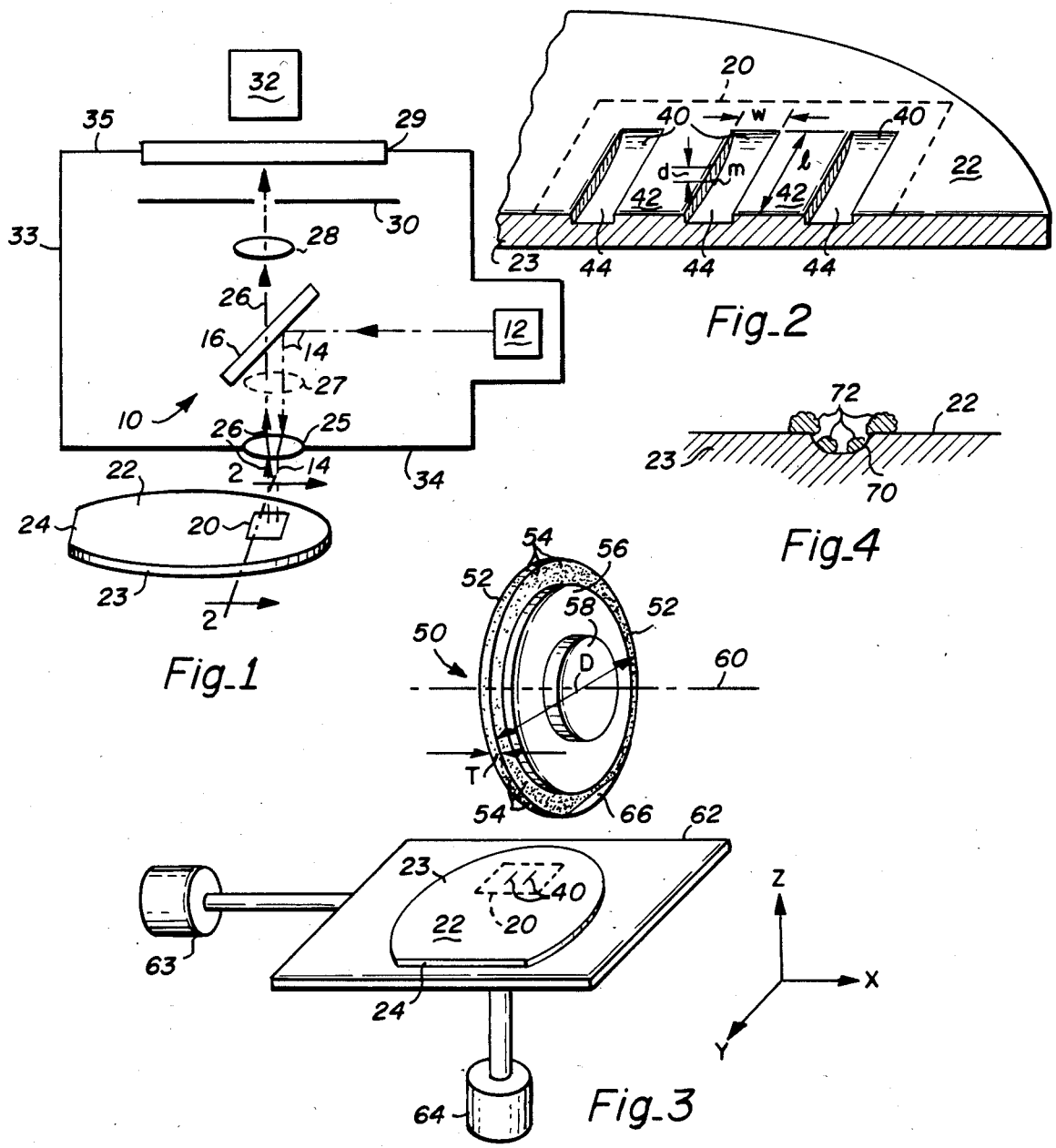

METHOD AND APPARATUS FOR READING AND MARKING A SMALL BAR CODE ON A SURFACE OF AN ITEM

BACKGROUND OF THE INVENTION

1. Field of the Invention

The present invention relates to an apparatus and method for marking and reading a small bar code inscribed on a surface of an item and more particularly, to a bar code reading system in which coaxial light is incident to and reflected by the bar code and in which the image of the bar code is magnified and projected on a screen before reading. The method for making the small bar code on the surface utilizes a conventional dicing saw blade.

2. Description of the Prior Art

There are many situations in which it is desirable to inscribe a bar code directly onto a surface of an item. For example, in the manufacturing process of silicon chips (integrated circuits), the location of a particular wafer during the manufacturing process may need to be determined. Similarly, for custom designed chips each wafer may have a different type of chip located on it, and hence, identification of a particular wafer is essential. Several methods are currently available for using bar codes to identify wafers. For example, U.S. Pat. No. 4,585,931 issued to Duncan, discloses a method for reading a bar code on a silicon wafer that utilizes radiation reflected off the bar code at a specified angle. Additionally, U.S. Pat. No. 4,585,931 discloses a method for marking the wafer with a laser and discloses a unique bar code in which the ratio of the spaces to the bars is in the range of one to four. The spacing requirements of standard bar codes are described in the publication *Code 39-Alphanumeric Bar Code Specifications*, published by Intermec ® (Jan. 1982).

U.S. Pat. No. 4,166,574, issued to Yokoyama discloses a method for marking identification symbols on the wafer using either a laser or a diamond needle.

U.S. Pat. No. 4,095,095, issued to Muraoka, et al. discloses an apparatus for reading information contained in the semiconductor pattern as a means of identifying the wafer. This apparatus utilizes a helium neon laser source and microscope type optics and relays the scanned information to a wafer processor control apparatus.

U.S. Pat. No. 3,562,536, issued to Brunner, et al. discloses a means for identifying a semiconductor wafer in which marks etched on the wafer are illuminated from the side, reflected through microscope type optics and detected by a photosensitive element.

Other patents disclosing semiconductor wafer identification processes are U.S. Pat. No. 4,010,355, issued to Roehrman, et al.; U.S. Pat. No. 3,558,899, issued to Morgan, et al.; and U.S. Pat. No. 3,597,045, issued to Mathisen.

The use of bar codes as a means of identifying many items, e.g. silicon wafers, requires that the bar code take up as little space as possible on the wafer and that the bar code contrast sharply with the background of the wafer. In U.S. Pat. No. 4,585,931, described above, a bar code system utilizing marks which are three to four times smaller than commerically available bar codes is disclosed. The smaller characters in this new bar code are formed by using laser marking techniques. A problem with laser marking techniques is that the high temperatures generated by the laser at the surface of the wafer vaporizes some silicon and creates irregularly shaped marks. Some of the vaporized silicon cools and leaves debris which breaks off later in the process and thus, contaminating the wafer. Additionally, the high temperature of the laser etching techniques causes stress fracture to the silicon crystalline struction of the wafer.

The problem of poor contrast between the marks of the bar code and the wafer surface is addressed in U.S. Pat. No. 4,585,931 by illuminating the bar code marks with a beam of light incident on the mark at an angle selected to reduce the intensity of scattered radiation. Despite this technique, problems still remain in reading very small bar codes, particularly after films have been deposited on the wafer during the manufacturing process. Furthermore, using laser etching techniques, the smallest bar widths that can be achieved are about two mils.

SUMMARY OF THE PRESENT INVENTION

It is therefore an object of the present invention to provide an improved apparatus for reading bar codes marked on a surface of an item, such as a semiconductor wafer, in which the contrast between the bar code and the item's surface is maximized.

It is another object of the present invention to provide an improved bar code reading apparatus in which very small bar codes can be read.

It is another object of the present invention to provide an improved method for making marks on the surface of an item in which reduced amounts of permanent debris are produced.

It is another object of the present invention to provide an improved method for making marks on the surface of an item having widths of about one mil.

It is another object of the present invention to provide an improved method for making marks on a semiconductor wafer in which stress to the crystalline structure of the wafer is minimized.

It is another object of the present invention to provide a bar code which can b easily deciphered by a person reading the bar code.

Briefly, a preferred embodiment includes a light source which produces a beam of collimated light which is then directed at a bar code region on the surface of an item by a beam splitter such that the incident beam strikes the surface at a ninety degree angle. The incident beam is focused and magnified by a first lens. A reflected beam, produced by reflectance off the bar code region on the surface, is then reflected back through the first lens coaxially with the incident beam of light. The reflected beam passes through a second lens where it is further magnified. The magnified reflected beam is then projected on an image screen where it can be easily detected by a standard bar code reader or other photosensitive detecting means. Two bar code systems are described which can be easily deciphered by a person if automatic detection is not possible.

An improved method for making marks on the surface involves using a high speed diamond impregnated nickel wheel to mark bars on the surface of an item.

An advantage of the present invention is that very small bar codes can be detected.

Another advantage of the present invention is that the use of collimated light produces a sharp contrast between the bars of the bar code and the surface of the item.

Another advantage of the present invention is that a bar code which can be easily deciphered by a person is described.

Another advantage of the present invention is that no permanent debris is produced by the marking process.

Another advantage of the present invention is that bars having a width of about one mil can be produced.

Another advantage of the present invention is that stress to the crystalline structure of a semiconductor wafer is reduced.

These and other objects and advantages of the present invention will no doubt become apparent to those skilled in the art after having read the following detailed description of the preferred embodiment which is illustrated in the various figures of the drawing.

IN THE DRAWING

FIG. 1 illustrates a bar code reading apparatus according to the invention;

FIG. 2 is a sectional view of the bar code region taken along line 2—2 of FIG. 1;

FIG. 3 is a perspective view of a commercially available dicing saw blade used in the method of the present invention for cutting bars in a surface;

FIG. 4 is a cross sectional view of a bar cut in a wafer by a laser using the method of the prior art;

FIG. 5 is a representation of a simplified bar code of the present invention; and FIG. 6 is a representation of another simplified bar code of the present invention.

DETAILED DESCRIPTION OF THE PREFERRED EMBODIMENT

Referring now to FIG. 1, there is shown a preferred embodiment of a bar code reading apparatus of the present invention designated by the general reference numeral 10. A collimated light source 12 emits an incident beam of collimated light 14 which is reflected off a beamsplitter 16. The light source 12 can be a collimated light such as a laser or a system comprising an incandescent lamp (e.g., a tungsten lamp) and a series of collimating lenses. The beamsplitter 16 can be of the commercially available variety such as a 50:50 beamsplitter (passes 50% of light, reflects 50% of light).

The beamsplitter 16 is oriented so that it reflects the incident beam 14 onto a bar code region 20 with the incident beam 14 striking the bar code region 20 at approximately a ninety degree angle to the plane containing bar code region 20. A key factor is that the incident beam 14 be approximately normal to the bar code region 20. Other optical arrangements, such as the use of mirrors or fiber optics, could be used to direct the incident beam 14 to the bar code region 20.

The bar code region 20 is an area on the exterior of a surface 22 of an item 23, such as a semiconductor wafer, which contains a plurality of bars and spaces of varying dimensions commonly referred to as a bar code. Generally, the bars are formed by inscribing marks on the surface 22. Other similar information carrying regions could be substituted for the bar code region 20 such as a region containing an alphanumeric inscription. The surface 22 of item 23 can be any surface of any item which is capable of reflecting the incident beam 14. Generally, this means that the surface 22 must be flat and smooth relative to the bar code region 20. For example, it is possible to have a flat region on a curved surface, such as an edge of a Winchester disk, provided that the curvature of the disk is small relative to the dimensions of the bar code region 20.

The item 23 is most commonly a silicon wafer. However, wafers of other semiconducting materials such as gallium arsenide could also be used. Additionally, any other smooth and flat substances such as glass, metal or ceramic substrates could be used as item 23. In FIG. 1, the item 23 is shown as a semiconductor wafer having the shape of a thin cylinder with a flattened area 24 on one end known as a "major flat".

A first lens system 25 is positioned between the beam splitter 16 and the bar code region 20. The lens system 25 is a combination of optical elements which focus the incident beam 14 on the bar code region 20. In the preferred embodiment, lens system 25 is an ordinary microscope objective lens. The incident beam 14 is reflected off the bar code region 20 as a reflected beam 26. Both the incident beam 14 and the reflected beam 26 are perpendicular to the surface 22 and form a coaxial beam 27. The lens system 25 magnifies the reflected beam 26. In the preferred embodiment, the lens system 25 is a 10:1 magnifier.

After passing through the lens system 25 and the beamsplitter 16, the reflected beam 26 passes through a second lens system 28 which further magnifies beam 25 and focuses it on an image screen 99. In the preferred embodiment, lens system 28 is an ordinary microscope eye piece lens assembly having a magnifying power of 10:1. A slit aperture 30 may be positioned between lens system 28 and screen 29. A detector unit 32, positioned on the opposite side of screen 29 from lens system 28, reads the magnified image of bar code region 20 projected on screen 29 by reflected beam 26. In the preferred embodiment, the screen 29 is a piece of frosted glass and the detector unit 32 is a standard bar code wand, with its light source disconnected, attached to a standard bar code reader. In general, the detector unit 32 comprises a phototransistor and other electronic circuitry for reading the image displayed on screen 29. A photo array circuit, such as a television screen could also be used as detector unit 32. Alternatively, the magnified image projected on the screen 29 can be detected by a person watching screen 29.

A housing 33 encloses source 12, beam splitter 16, lens systems 25 and 28, aperture 30 and screen 29. The lens system 25 is positioned in a wall 34 of housing 33 so as to provide a means for the incident beam 14 to exit the housing 33. Similarly, the screen 29 is positioned in an opposite wall 35 to provide a means for the detector 32 to access screen 29.

FIG. 2 shows the bar code region 20 in more detail. The bar code region 20 contains a plurality of bars 40, which are indented regions in the surface 22, and a plurality of spaces 42 which are unindented regions lying between two bars 40. In the preferred embodiment, the bars 40 are oriented on the surface 22 such that they are perpendicular to the major flat 24 (shown in FIG. 1). However, the orientation of bars 40 on the surface 22 is irrelevant and other orientations could be used. The bars 40 have a length "l", a width "w" and a depth "d" as shown in FIG. 2. In the preferred embodiment, the bars 40 have an arcuate or curved bottom surface 44. The depth d is greatest at the midpoint "m" along the length l of bars 40.

A common practice in the art is to cut the bars 40 by using a laser to etch the surface 22. The present invention uses a commercially available dicing saw blade 50, shown in FIG. 3, to cut the bars 40. The dicing saw blade 50 is a very fine grinding wheel comprising a thin nickel rim 52 with very fine diamonds 54 impregnated in it. The rim 52 has a thickness "T" and the blade 50 has a diameter "D" as shown in FIG. 3. The rim 52 circumscribes a hub 56, generally made of aluminum. A hole 58 is circumscribed by the hub 56 providing a means for rotating blade 50 about an axis 60.

The surface 22 lies on a platform 62 such that the plane of the surface 22 is perpendicular to a plane containing blade 50. A pair of stepping motors 63 and 64 move the platform 62 and hence, surface 22, in incremental amounts in the X and Y and Z directions, respectively, as shown in FIG. 3. The motors 63 and 64 should be capable of moving platform 62 in increments of 0.000050 inches per step.

To cut the bars 40, the blade 50 is held at a fixed position above surface 22 and rotated at high speeds around the axis 60 (approximately 30,000–40,000 revolutions per minute). Platform 62 is then raised in the Z (vertical) direction by stepping motor 64 until surface 22 contacts the rim 52. An electrical circuit can be used for controlling the relative distance between the surface 22 and the blade 50. Such a circuit includes applying a voltage between blade 50 and platform 62. A current sensing circuit then detects the flow of current through blade 50 and surface 22 to the platform 62 when the blade 50 comes into contact with the surface 22.

The rim 52 grinds a groove in the surface 22 to form the bar 40. The platform 62 is then lowered in the Z direction until the blade 50 is clear of surface 22. The platform 62 is moved an incremental amount in the X (horizontal) direction by stepping motor 63 and platform 62 is then raised again in the Z direction until wafer 22 contacts rim 52 and another groove is cut into the surface 22. The process of lowering platform 62, moving it an incremental horizontal distance and cutting another groove is repeated until the desired number of bars 40 are obtained.

In the method just described, the same results could be achieved by moving the blade 50 in the vertical and horizontal directions instead of moving platform 62. Similarly, the surface 22 in FIG. 3 could be located in the X-Z plane instead of in the X-Y plane or it could be located in the X-Y plane above blade 50.

During the grinding process, the surface 22 can be flooded with a liquid such as water to continuously remove debris formed by the cutting process.

Bars 40, cut with the dicing blade 50, have the approximate shape shown in FIG. 2. The bars 40 are arcuate grooves which correspond in shape to a region 66 on rim 52 which cuts into the surface 22. The dimensions of bars 40 are dependent on the dimensions of the rim 52. Generally, the width "w" of a bar 40 will be approximately 0.5 mil greater than the thickness "T" of the rim 52. Since blades 50 are commercially available having rims 52 with widths "T" of 0.5 mil (1 mil=0.001 inches), it is possible to cut bars 40 having a width of one mil. In the present method, densities of forty to fifty characters per inch are achieved (using, for example, cod 39 which has five lines/character). Wider lines can be made by making multiple cuts. Alternatively, a wider blade can be used, but this requires changing the blade. The length "l" and depth "d" of bars 40 are dependent on how deeply rim 52 cuts into the wafer 22. Typical lengths "l" and depths "d" of bars 40 are as follows:

| Length (inches) | Depth (inches) |
|---|---|
| .066 | .0005 |
| .100 | .0011 |
| .125 | .0018 |

The maximum depth of the bar 40 (point m in FIG. 2) should be deep enough to maintain good contrast with the space 42 even after the surface 22 has gone through the integrated circuit manufacturing process. Maximum depths of about 0.001 inch are adequate for this purpose. Because the bars 40 have the arcuate shape shown in FIG. 2, the actual depth decreases smoothly from the maximum depth at point "m" to zero at the ends of bars 40.

In contrast to bars 40, FIG. 4 shows the representative shape of a laser cut bar 70. A plurality of particles 72 are located in and around the bar 70. The particles 72 are formed when material, vaporized by the heat of the laser, cools around the edges of bar 70. The particles 72 cause irregularities in the otherwise smooth surface 22 which can cause problems in wafer photolithography for example. Additionally, in semiconductor wafer processing, the particles 72 can break loose from the surface 22 during the integrated circuit manufacturing process, causing contamination of the wafer surface.

Referring to FIGS. 1 and 2, the method of reading the bar code region 20 can now be explained. The incident beam 14 strikes the bar code region 20 at a ninety degree angle to the surface 22. The reflected beam 26 comprises light that is reflected from the spaces 42. Because the surface 22 is smooth and flat, the spaces 42 are highly reflective. On the other hand, light striking the bars 40 is poorly reflected. The arcuate shape of the bottom surface 44 of the bars 40 improves the contrast between the bars 40 and the spaces 42 because the curvature of surface 44 causes the incident beam 14 to be reflected at many different angles. The reflected beam 26 is reflected off the spaces 42 at a ninety degree angle to the surface 22 and hence is coaxial with incident beam 14. The coaxial arrangement of the beams 14 and 26 allows both beams to be highly magnified.

The combination of the lens systems 25 and 28 magnifies reflected beam 26 approximately one hundred times. This allows extremely small bar codes to be read by inexpensive, commercially available bar code readers which can serve as the detector 32 thus keeping the price of the apparatus 10 relatively low. The magnified image of the bar code region 20, carried by reflected beam 26, is projected on the image screen 29. The bars 40 show p on the screen 29 as dark regions while the spaces 42 show up as light regions. The detector 32 detects the light and dark regions projected on the screen 29. Because the magnified image projected on screen 29 is too large to be read all at once by detector 32, the entire surface 22 is moved laterally under the incident beam 14. Alternatively, the surface 22 can be rotated through beam 14. As the bar code region 20 moves through the incident beam 14, the images of the plurality of spaces 42 and bars 40 are projected on the screen 29.

For reading alphanumeric characters instead of a bar code, an array of photosensors are used as the detector 32. The array includes a line of photosensors placed along the length of the characters. This produces signals at the array similar to a dot matrix printer.

The slit aperture 30 functions to eliminate extraneous light such as light from other sources.

In a working embodiment of the bar code reading apparatus 10, the first lens system 25 comprised a microscope objective lens manufactured by Olympus, part number MDPL 10X. The beam splitter 16 comprised a beam splitter obtained from Melles Griot, part number 03 BTF 007. The second lens system 28 comprised a microscope eye piece manufactured by Olympus, part number WK 10X. The detector 32 comprised a bar code wand (with the light source removed) and a bar code reader, both manufactured by Intermec Corp., model numbers 1240A and 9320, respectively. The dicing saw blade 50 was obtained from Semitec Corp., part number S 0815.

FIG. 5 shows a bar code system 78 patterned after the Roman numeral system. The numbers 0-9, designated by the reference numbers 80-89, respectively, are represented by characters constructed from a system of narrow bars 90, narrow spaces 92, wide bars 94 and wide spaces 96 as shown in FIG. 5. A start symbol 98 marks the beginning of a sequence of numbers and an end symbol 100 marks the end of the sequence. In the bar code system 78, the narrow bars 90 function as the Roman numeral element "I" and the wide bars 94 function as the Roman numeral element "V". Alternatively, the narrow bars 90 can be considered as having a weight of one and the wide bars 94 as having a weight of five. The start and stop symbols 98 and 100 and the zero symbol 80 do not have Roman numeral analogs.

The narrow spaces 92 function to separate combinations of narrow bars 90 and wide bars 94 from each other within a number or start or end symbol. The wide spaces 96 function to separate individual numbers from each other and to separate start and end symbols from the numbers.

The width of the wide bar 94 or narrow bar 90 can vary depending on the application of the bar code system 78. For identifying silicon wafers the width of the narrow bar 90 would be in the range of 0.001 to 0.003 inches. The width of the wide bar 94 should be at least two times that of the narrow bar 90. The ratio of narrow space width to narrow bar width should be 1.0 or greater. Similarly, the ratio of wide space width to wide bar width should be 1.0 or greater.

An important feature of the bar code system 78 is that it can be easily deciphered by a person if the detector 32 fails. For example, a person could simply place the wafer 22 under the bar code reading apparatus 10 and read the bar code 78 directly off screen 29, deciphering it by analogy to Roman numerals.

FIG. 6 shows a bar code system 102 that is also easily deciphered by a person. The bar code system 102 is patterned on the common system of using a sequence of four vertical marks to designate the numbers 1-4 followed by a slash to designate the closing of a group of five (i.e., 1, 11, 111, 1111, etc.)

In the bar code system 102 the numbers 0-3 and 5-8, designated by the reference numbers 80-83 and 85-88, respectively, are represented by the same combination of narrow bars 90, narrow spaces 92, wide bars 94 and wide spaces 96 as were used in the bar code system 78. Additionally, the same start symbol 98 and end symbol 90 is used in system 102 as was used in system 78, and the width relationships between bars and spaces is the same in system 102 as in system 78. In system 102, the numbers 4 and 9 are represented by the characters designated by reference numerals 104 and 109, respectively. In system 102, the wide bar character 85 corresponds to the group of five figure.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modification as fall within the true spirit and scope of the invention.

I claim:

1. An apparatus for reading a small bar code region marked on a surface of an item comprising:
   a collimated light source which emits an incident beam of light;
   a means for directing part of the incident beam, including a beam splitter so that the incident beam strikes a bar code region on a surface of an item at approximately a ninety degree angle from a plane containing the bar code region;
   a first lens system positioned between the means for directing and said surface, for focusing the incident beam on the bar code region and for magnifying and focusing a reflected beam of light on a second lens system positioned coaxially with the first lens system, on an opposite side of the beam splitter from the first lens system, the second lens system functioning to further focus and magnify the reflected beam;
   an image screen for displaying the reflected beam after it passes through the second lens system; and
   a detector for reading the reflected beam displayed on the image screen.

2. The apparatus of claim 1 wherein,
   the collimated light source comprises a halogen lamp and a lens system for collimating a beam of light emitted from the halogen lamp.

3. The apparatus of claim 1 wherein,
   the collimated light source is a laser.

4. The apparatus of claim 1 wherein,
   the detector comprises a bar code reader with its light source disconnected.

5. The apparatus of claim 1 wherein,
   the detector includes a phototransistor.

6. The apparatus of claim 1 wherein,
   the detector includes a photoarray.

7. The apparatus of claim 1 wherein,
   the item is a semiconductor wafer.

8. The apparatus of claim 1 wherein,
   the item is comprised of glass.

9. The apparatus of claim 1 wherein,
   the item is comprised of ceramic material.

10. The apparatus of claim 1 wherein,
    the item is comprised of metal.

11. The apparatus of claim 1 further including a slit aperture positioned between the second lens system and the image screen for reducing the intensity of extraneous light.

12. The apparatus of claim 1 wherein,
    the means for directing is a beam splitter which reflects part of the incident beam.

13. A method for reading a bar code region marked on a surface of an item which comprises:
   a. generating an incident beam of collimated light;
   b. focusing the incident beam on at least a part of a bar code region such that the incident beam is perpendicular to a plane containing the bar code region;

c. magnifying a reflected beam of light which is reflected off the bar code region and which is coaxial with the incident beam;

d. projecting the magnified reflected beam of light on a screen such that a magnified image of the part of the bar code region illuminated by the incident beam is generated; and e. detecting the image projected on the screen.

14. The method of claim 13 further including the step of:

a. reducing the intensity of the reflected beam before projecting it on the screen.

15. The method of claim 13 further including the step of:

composing the bar code region from a plurality of bars and spaces of selected length, width and depth.

16. The method of claim 13 further including the step of:

composing the bar code region from a plurality of bar code characters, each bar code character including at least one narrow bar or one wide bar with a narrow space existing between any two bars, either narrow or wide, positioned adjacent to each other and with a wide space existing between any two characters adjacent to each other and each character corresponding to one of the Roman numerals I-IX.

* * * * *

UNITED STATES PATENT OFFICE
CERTIFICATE OF CORRECTION

Patent No. 4,794,238                    Dated December 27, 1988

Inventor(s)     Gordon P. Hampton

It is certified that error appears in the above-identified patent and that said Letters Patent is hereby corrected as shown below:

Col. 2, line 41, "b" should be --be--;
Col. 5, line 62, "cod" should be --code--;
Col. 6, line 53, "p" should be --up--; and
Col. 7, line 57, --1111-- should appear before "~~1111~~".

Signed and Sealed this

Thirteenth Day of June, 1989

Attest:

DONALD J. QUIGG

Attesting Officer    Commissioner of Patents and Trademarks